(12) United States Patent
Muenkel (10) Patent No.: US 8,313,549 B2
(45) Date of Patent: Nov. 20, 2012

(54) FILTERING DEVICE, IN PARTICULAR AN AIR FILTER FOR AN INTERNAL COMBUSTION ENGINE

(75) Inventor: Karlheinz Muenkel, Oberderdingen-Flehingen (DE)

(73) Assignee: Mann + Hummel GmbH, Ludwigsborg (DE)

(*) Notice: Subject to any disclaimer, the term of this patent is extended or adjusted under 35 U.S.C. 154(b) by 584 days.

(21) Appl. No.: 12/589,527

(22) Filed: Feb. 26, 2009

(65) Prior Publication Data

US 2010/0313533 A1    Dec. 16, 2010

(30) Foreign Application Priority Data

Feb. 26, 2008 (DE) .................. 10 2008 011 186
Feb. 26, 2009 (WO) ............ PCT/EP2009/052315

(51) Int. Cl.
*B01D 46/00* (2006.01)

(52) U.S. Cl. ............ 55/498; 55/484; 55/489; 55/500; 55/502; 55/521

(58) Field of Classification Search .......... 55/484, 55/488, 489, 498, 500, 502, 521
See application file for complete search history.

(56) References Cited

U.S. PATENT DOCUMENTS

| 3,361,260 A | 1/1968 | Ernest |
| 4,410,427 A | 10/1983 | Wydeven |
| 5,152,890 A * | 10/1992 | Linnersten .................. 210/315 |
| 5,674,393 A | 10/1997 | Terhune et al. |
| 6,511,599 B2 | 1/2003 | Jaroszczyk |
| 6,599,342 B2 * | 7/2003 | Andress et al. ............. 55/495 |
| 6,852,148 B2 * | 2/2005 | Gieseke et al. ............. 95/287 |
| 6,966,940 B2 | 11/2005 | Krisko et al. |
| 7,597,734 B2 * | 10/2009 | Johnson et al. ............. 55/482 |
| 7,740,678 B2 * | 6/2010 | Gunderson et al. ......... 55/484 |
| 7,837,754 B2 * | 11/2010 | Johnson et al. ............. 55/482 |

FOREIGN PATENT DOCUMENTS

| DE | 2034670 | | 1/1972 |
| DE | 20005756 | | 8/2000 |
| DE | 20005756 U1 | | 8/2000 |
| DE | 102006025232 | | 5/2006 |
| EP | 0152513 | | 8/1985 |
| EP | 1254689 | | 11/2002 |
| EP | 1364695 | | 11/2003 |
| FR | 1288229 | | 3/1962 |
| GB | 562103 | | 6/1944 |
| GB | 562103 A | * | 6/1944 |
| GB | 891854 | | 3/1962 |
| WO | WO2006066697 | | 6/2006 |

OTHER PUBLICATIONS

PCT search report PCT/EP2009/052315; German patent office action in DE 10 2008 011 186.4.
EP Office Action on EP 09 715 487.6 dated Dec. 6, 2011.

* cited by examiner

*Primary Examiner* — Robert Clemente
(74) *Attorney, Agent, or Firm* — James Hasselbeck (57) ABSTRACT

A filter device comprises a filter element that is comprised of at least two radially nested filter bellows, wherein at least one filter bellows is to be flown through in the radial direction and a flow space for the fluid is formed between the filter bellows. Each filter bellows is embodied as a star-shaped filter with filter folds arranged in a star shape. On at least one end face of the filter element a sealing ring is arranged between a filter bellows and the filter housing.

15 Claims, 9 Drawing Sheets

Fig. 7

FILTERING DEVICE, IN PARTICULAR AN AIR FILTER FOR AN INTERNAL COMBUSTION ENGINE

CROSS REFERENCE TO RELATED APPLICATIONS

Priority is claimed based on Federal Republic of Germany patent application no. 102008011186.4 filed Feb. 26, 2008. Priority is further claimed based on international patent application number PCT/EP2009/052315, filed Feb. 26, 2009 designating the United States of America, The entire disclosure of these applications is incorporated herein by reference.

TECHNICAL FIELD

The invention concerns a filter device, especially an air filter for an internal combustion engine.

PRIOR ART

For example, EP 1 364 695 A1 discloses an air filter that is integrated into the intake manifold of an internal combustion engine in order to subject the combustion air to be supplied to the cylinders of the internal combustion engine to a filtration action. The air filter is substantially of a three-part configuration and comprises a filter element that is configured as an exchangeable filter cartridge through which the combustion air flows axially and that is insertable radially by means of a closable lid into the filter housing. The filter cartridge has arranged upstream thereof a cyclone preseparator that serves for separation of coarse dirt particles. Downstream of the filter cartridge there is a secondary or fine filter element that also is insertable radially into the filter housing when the lid is open. Cyclone preseparator, filter cartridge, and fine filter element are positioned axially sequentially behind one another and the combustion air to be filtered passes through them without deflection in the axial direction.

As a main filter element that is received in the filter cartridge, for example, wound filters are suitable that are comprised of a corrugated filter material that is wound about a core, wherein as a result of the corrugation axial flow passages are formed by the filter element that are closed of alternatingly at the end faces. Such a filter element is, for example, disclosed in U.S. Pat. No. 7,008,467 B2.

Also known are filter elements that are comprised of a star-shaped folded filter element in the form of a filter bellows whose filter folds extend in radial direction wherein the front edges of the filter folds extend in axial direction.

A filter element of a different configuration that is also suitable for air filtration is disclosed in FR 1 288 229. The filter element is comprised of two radially nested filter bellows or star-shaped filters with filter folds that are arranged in a star-shape and between which a flow space for the axial outflow of the filtered fluid is arranged. The inner side of the radially inwardly positioned filter bellows as well as the outer side of the radially outwardly positioned filter bellows each form the unfiltered side by means of which intake of the fluid to be filtered is realized radially through the filter element. The intermediately positioned flow space serves for axial outflow of the filter fluid.

SUMMARY OF THE INVENTION

The invention has the object to provide with simple constructive measures a filter device that is characterized by a high filtration efficiency wherein the filter device should be designed to be serviced with minimal expenditure.

This object is solved according to the invention with the features of the independent claims. The dependent claims provide expedient further embodiments.

According to a first solution of the invention the filter device comprises a filter element in a filter housing that is configured as a multi-bellows filter, in particular as a double-bellows filter, with at least two radially nested filter bellows between which a flow space for the fluid is formed, wherein the flow space communicates with an end face of the filter element. Each filter bellows is configured as a star-shaped filter with filter folds arranged in a star shape and extending in the radial direction and having axially extending front edges. The radially inwardly positioned front edges of the folds of the outer filter bellows as well as the radially outwardly positioned front edges of the folds of the inwardly positioned filter bellows delimit the flow space, respectively, that serves expediently for outflow of the filtered fluid, optionally also for intake of the unfiltered fluid.

Moreover, on at least one end face of the filter element a sealing ring is arranged which is located between the filter bellows and the filter housing. The sealing ring serves in particular for fluid-tight separation of the unfiltered side from the filtered side of the filter element and prevents thus leakage flows that would impair the efficiency of the filter device. The sealing ring is expediently clamped axially between the filter element and the inner side of the housing and is force-loaded in the axial direction. Basically, a radial force loading or a combination of axial and radial loading is also suitable. Moreover, the sealing ring is advantageously arranged at the radial outer side of the filter element, in particular at a transition between axial end face and radially outwardly positioned wall surface of the filter element. This embodiment enables intake of at least a partial flow of the fluid to be filtered via the radially outwardly positioned wall surface of the filter element and passage for filtration radially through the filter element until it reaches the flow space between the two filter bellows. In this embodiment, the sealing ring delimits at the same time the annular space between the inner side of the housing and the outer wall surface of the sealing element in the axial direction.

Intake to the filter element embodied as a multi-bellows filter as well as outflow of the filtered fluid can be carried out in different ways. On the one hand, it is possible to enable flow through the wall of each filter bellows exclusively in radial direction and to remove the filtered fluid exclusively axially through the flow space that constitutes at the same time the clean chamber. Moreover, mixed forms are possible also, for example, in such a way that at least one bellows, in addition to the radial flow, also has axial intake and, likewise, the outflow of at least one bellows, in addition to flow being guided through the flow space in the axial direction, is realized also by flow passages within a bellows. Advantageously, the axial intake is however realized through flow passages of the first filter bellows, for example, of the outwardly positioned filter bellows, and the axial outflow is realized through flow passages of the second filter bellows, for example, of the radially inwardly positioned filter bellows. In order to achieve intake and outflow in the desired way, cover elements are expediently provided, in particular cover disks or cover rings on the corresponding axial end faces of the filter bellows. For example, the axial end face of the radially inwardly positioned filter bellows at the intake side of the filter element is covered by a cover ring so that at this location an axial intake is prevented. The axial end face in the intake area of the radially outwardly positioned filter bellows however can be open in order to enable at this location also axial intake in addition to radial intake.

At the outflow side of the filter bellows, there is advantageously a cover disk that closes off the inwardly positioned intake space within the filter bellows in the axial direction in order to prevent leakage immediately between the unfiltered side and the filtered side. The axial end face of the inner filter bellows however can remain without a cover so that through it an axial outflow is possible in principle. At the same time, the axial end face in the outflow area of the radially outwardly positioned filter bellows is covered by a cover ring which prevents axial outflow at this location.

Moreover, it is expedient to tack two immediately neighboring filter folds together on an axial end face of a filter bellows, in particular to adhesively connect them or glue them together. Advantageously, this is done for each filter bellows such that only at one axial end tacking of the front edges of the filter folds is performed while the front edges of the filter folds at the opposed end face are covered by a cover element. Relative to the two filter bellows, the tacking of the front edges of the filter folds and covering are performed alternatingly so that, for example, on the radially outwardly positioned filter bellows the front edges are adhesively connected and on the opposite axial end face they are covered by a cover ring and on the radially inwardly positioned filter bellows the axial intake side is covered by a cover disk and the front edges at the opposite axial outflow side are tacked together. By tacking the front edges flow spaces or passages are produced in the axial direction wherein by interaction with the cover elements it is ensured that the supplied fluid must flow through the filter wall in the radial direction.

The filter bellows are preferably configured as star-shaped filters. It can also be expedient not to provide a star-shaped folding but a folding in the axial direction with fold edges that extend in the circumferential direction or at least have a component extending in the circumferential direction. Such filter bellows with a bellows action in the axial direction can be provided with or without folds arranged in a star shape. Optionally, there is also the possibility of folding in a star shape and folding in the axial direction.

The filter bellows are preferably designed as individual bellows that are radially nested and concentrically arranged relative to one another. According to one embodiment, it is also possible to form two or optionally even more filter bellows from a single contiguous bellows in that at one or several locations of the single bellows a section is bent wherein the bending edge forms an axial front edge of the intake or outflow side of the filter element.

Moreover, it is possible to design the filter bellows to be identical with identical configuration across axial length or to be different. Possible is a cylindrical shape as well as a conical shape of a filter bellows or of both filter bellows. According to an advantageous embodiment it is provided that the radially outwardly positioned filter bellows has a cylinder shape whose outer diameter and inner diameter do not change across the axial length and that the radially inwardly positioned filter bellows has a cone shape wherein the cone expediently tapers from the intake side to the outflow side. In this way, a flow space between the filter bellows is produced in the form of an annular cone that widens toward the outflow side; this may be advantageous in regard to fluidic considerations with regard to outflow of the filtered fluid. Across the axial length the flow space has thus a changing cross-section wherein the rate of change is constant. Basically, also a varying rate of change is possible across the axial length. Moreover, the flow space can also have identical cross-section which is the case when the inner side of the outer filter bellows and the outer side of the inner filter bellows are positioned concentrically to one another.

Moreover, it can be advantageous to provide between the filter bellows a support frame which frames the flow space between the filter bellows. In particular, for large volume filtering devices whose filter elements have a correspondingly higher weight, the support frame that is preferably comprised of synthetic material and expediently comprises webs extending in the axial direction as well as in the circumferential direction increases the stability.

According to a further aspect of the invention, the filter device has a filter element in the filter housing which filter element is comprised of a continuous filter web with a plurality of parallel filter layers that are connected to one another by curved connecting sections of the filter web wherein between neighboring filter layers spacers are provided and the intermediate spaces between the neighboring filter layers provide flow spaces for the fluid. The filter layers are planar or flat; accordingly, the intermediately positioned flow spaces are thus delimited by parallel planes. By means of the curved connecting sections of the filter web that delimit alternatingly neighboring flow spaces at the opposite end faces of the filter elements, it is ensured that every other flow space at the intake side is open or closed. The fluid to be filtered is introduced axially into the open flow spaces and must pass in the flow space radially the delimiting filter wall because the opposite axial end face of this flow space is closed off at the outflow side by the curved connecting section. The radial passage into the neighboring flow space enables axial outflow from the filter element, only closed at the intake side by the curved connecting section, while the outflow side is axially open.

According to an advantageous embodiment it is provided that the spacers or a part of the spacers are in the form of adhesive traces, for example, glue beads or adhesive dots, by means of which the neighboring filter layers are adhesively connected. The adhesive traces therefore fulfill a dual purpose. On the one hand, they connect neighboring parallel extending filter layers with one another, on the other hand, they keep the filter layers at the desired spacing relative to one another, so that a corresponding flow space with desired dimension is formed. Optionally, the adhesive traces are combined with other, non-adhesive spacers that are embodied either as separate components or, for example, are generated by embossment of the filter web in a direction transverse to the axial direction.

The entire filter element is comprised preferably of precisely one continuous filter web that is folded to form the filter layers, which has advantages in particular with regard to manufacturing-technological aspects. For example, it is possible to apply onto a flexible filter web at least two parallel extending adhesive traces and to subsequently fold the filter web to a plurality of parallel extending filter layers so that the adhesive traces are located between two neighboring filter layers and adhesively connect them.

With regard to the outer dimensions the filter element has a parallelepipedal shape wherein opposed end faces of the parallelepiped form the intake and outflows sides.

According to a further aspect of the invention, the filter element is cylindrically designed and has a plurality of concentrically arranged filter cylinders or is spirally wound, wherein the filter cylinders each are comprised of filter material wherein between neighboring filter cylinders spaces are provided and the intermediate spaces between neighboring filter cylinders provide flow spaces for the fluid. In order to prevent that the unfiltered fluid that is supplied axially at one side is guided without filtration to the opposite end face, the flow spaces between the filter cylinders are expediently alternatingly open at one axial end face and closed at the opposite end face, respectively. This is done, for example, in such a way that immediately neighboring flow spaces that are concentrically positioned relative to one another are open or closed at the axial intake side and, correspondingly, are closed or open at the opposite outflow side. In this way, it is ensured that fluid flowing into the filter element must pass radially the wall of the neighboring filter cylinders within the flow spaces in order to reach the neighboring flow space from where axial outflow is possible.

According to an expedient embodiment, between the concentric filter cylinders spacers are provided that are embodies as adhesive strips. In principle, it is possible to provide exclusively adhesive strips as spacers or a combination of adhesive and non-adhesive spacers.

In all aforementioned filter devices, advantageously sealing rings are provided between the filter element and the inner side of the filter housing that separate the unfiltered side from the filtered side of the filter element in question. The sealing ring is preferably located adjacent to the outflow side and in particular at the transition between the outer wall surface of the filter element and the axial end face in the outflow area. This configuration makes it possible to also utilize the outwardly positioned wall surface as a flow side in particular for intake of the unfiltered fluid. The force loading of the sealing ring is realized preferably in the axial direction but optionally also an exclusive or additional radial loading of the sealing ring can be expedient.

The sealing ring extends in radial direction advantageously up to the outer wall surface of the filter element; it thus does not project radially. According to a further embodiment it can be expedient however that at least one section of the sealing ring radially projects past the outer wall surface of the filter element.

Advantageously, the filter element, independent of its constructive embodiment, is to be radially inserted into the filter housing by means of a housing opening that is to be closed by a lid and is to be flown through axially by the fluid to be filtered. Moreover, it can be expedient to arrange upstream of the filter element a prefilter that is embodied in particular as a cyclone preseparator and is expediently also flown through in the axial direction. Moreover, according to a further advantageous embodiment, a secondary or fine filter element can be arranged downstream of the filter element and, advantageously, it is also flown through in the axial direction. In combination with the prefilter, one thus achieves as a whole an axial flow through three filter units. The downstream fine filter element is preferably inserted like the main filter element radially through the closable housing opening into the filter housing. As a fine filter element, block-shaped elements are suitable, for example.

BRIEF DESCRIPTION OF THE DRAWINGS

Further advantages and expedient embodiments are to be taken from the additional claims, the Figure description, and the drawings. It is shown in:

In the Figures, same components are provided with same reference numerals.

EMBODIMENT(S) OF THE INVENTION

Figures 1, 2:
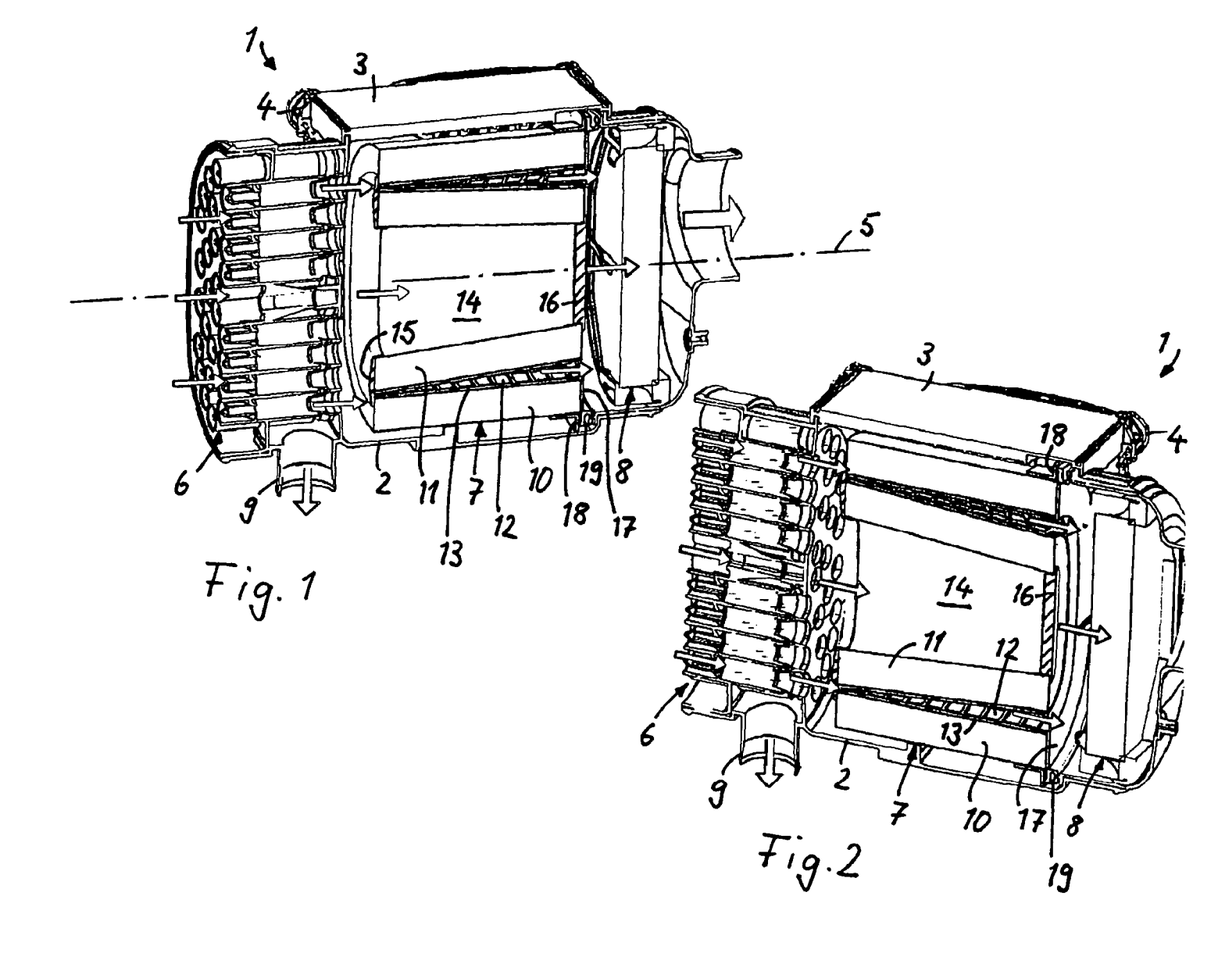
FIG. 1 a perspective illustration of a filter device that is used in particular as an air filter for internal combustion engines and comprises axially sequentially arranged a cyclone preseparator, a main filter element, and a downstream fine filter element, wherein the main filter element is embodied as a double bellows filter with two radially nested filter bellows.
FIG. 2 the filter device according to FIG. 1 in a different perspective.

The filter device 1 illustrated in FIGS. 1 and 2 is an air filter for an internal combustion engine comprised of a filter housing 2 in which a main filter element 7 is received, a cyclone preseparator 6 as a prefilter, as well as a downstream fine filter element 10. The filter housing 2 has at its circumferential wall an opening which is covered by a closable lid 3 that is arranged detachably by means of closure elements 4. By means of this opening in the wall surface of the filter housing the main filter element 7 and expediently also the fine filter element 8 can be inserted into or removed from the receiving space within the filter housing 2 radially or transversely to the axial direction. The main filter element 7 is positioned immediately below the lid 3, the downstream fine filter element 8 is positioned however axially displaced in a projection of the filter housing so that for insertion of the fine filter element 8 it must first be radially inserted into the filter housing 2 with the lid in the open position and subsequently axially moved into the projection.

The cyclone preseparator 6 is also located in a projection which is formed integrally with the filter housing 2. In the cyclone preseparator the dirt particles are transported outwardly away from the axially supplied air by centrifugal force in a rotating air flow and separated. By means of a removal opening 9 in the filter housing that is directed downwardly, the dirt particles that have been separated in the cyclone preseparator can be removed from the filter housing. Optionally, the projection in which the cyclone preseparator is received is embodied as a separate component that is connected to the filter housing.

Preseparator 6, main filter element 7, and fine filter element 8 are positioned axially sequentially behind one another and have the same longitudinal axis 5 which at the same time is the longitudinal axis of the entire filtering device 1. The fluid to be filtered flows through in axial direction according to the illustrated arrows.

Figure 3:
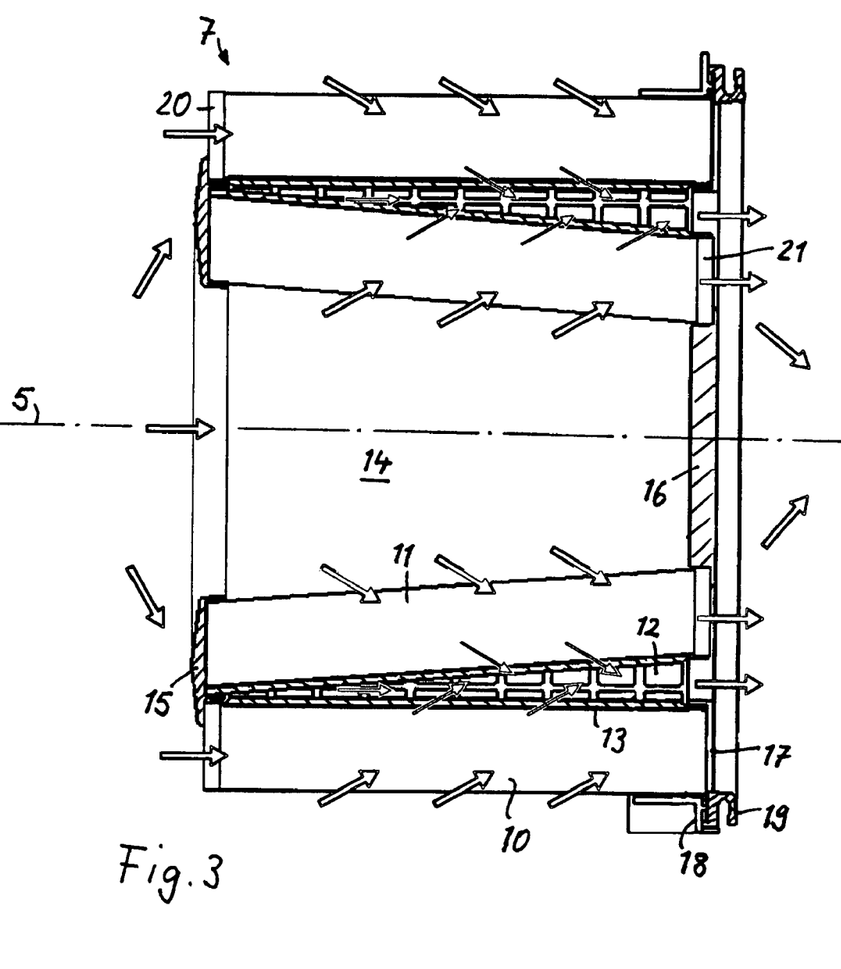
FIG. 3 the main filter element of the filter device of FIG. 1 or 2 in section.

The main filter element 7 is comprised of two individual radially nested filter bellows 10 and 11 wherein the outer filter bellows 10 is cylindrical and the inner filter bellows 11 is conical and tapers in the flow direction but has a uniform fold width. Between the inner side of the outer filter bellows 10 and the outer side of the inner filter bellows 11 there is a flow space 12 that, as a result of the deviating shape of the two filter bellows 10 and 11, in axial direction has a changing cross-section. Since the inner filter bellows 11 tapers in the flow direction, the flow space 12 has accordingly a cross-section that increases in the flow direction.

A support frame 13 frames the flow space 12 and supports the two filter bellows 10 and 11 relative to one another and provides additional stability to the entire filter element 7. The flow space 12 is closed off at the axial intake side which can be achieved in that at this side a cover ring 15 is arranged which covers the axial end face of the radially inwardly positioned filter bellows 11 and additionally also the narrow gap at the flow space 12 at this side. As best seen in FIG. 3, the cover ring 15 preferably completely covers the filter media folds at the end face of the inwardly positioned filter bellows 11. Again as shown in FIG. 3, the cover ring 17 preferably completely covers the filter media fold at the opposing end face of the outwardly positioned filter bellows 10. However, it can also be expedient to join the two filter bellows 10 and 11 at the intake side of the main filter element to such an extent that no flow gap relative to the intake side is provided. In this case, it is sufficient to arrange the cover ring 15 only at the axial end face of the inner filter bellows 11.

The prefiltered fluid from the cyclone preseparator 6 is supplied axially to the end face intake of the main filter element 7. A portion of the fluid flows immediately axially into the interior 14 of the inner filter bellows 11 that is closed relative to the outflow side by a cover disk 16. The cover disk 16 extends radially only across the opening of the interior 14 so that the fluid in the interior 14 is prevented from flowing out axially by the cover disk 16 and instead must flow radially through the wall of the inner filter bellows 11 and farther into the flow space 12 between the filter bellows 10 and 11 that represents a clean chamber for the fluid filtered by the main filter element 7.

A second partial flow of the fluid supplied to the main filter element 7 passes immediately through the axial end face or intake side into the radially outwardly positioned filter bellows 11 that is closed off at the opposite axial outflow side so that the incoming fluid flows radially inwardly into the flow space 12 that is open toward the filtered side of the main filter element 7 so that the filtered fluid can flow axially out of the flow space 12. A further partial flow reaches the radially outwardly positioned wall surface of the outwardly positioned main filter element 10 and flows radially through it from the exterior to the interior into the flow space 12.

As illustrated in FIGS. 1 and 2 and in particular in the enlarged illustration of the filter element 7 according to FIG. 3, the axial end face of the radially outwardly positioned first filter bellows 10 in the area of the filtered side or outflow side is covered by a cover ring 17 that prevents axial outflow of the fluid so that the fluid at the outer bellows 10 is forced to flow radially from the exterior to the interior into the flow space 12.

A connecting flange 18 is integrally formed with the cover ring 17 and is located at the radial outer side of the radial outer filter bellows 10 in the area of the outflow side and delimits and supports a sealing ring 19 that is clamped at the outflow side axially between the connecting flange 18 and the housing component of the filter housing. This sealing ring 19 separates the unfiltered side from the filtered side of the filter element 7. The sealing ring 19 has a U-shaped profile wherein the open U-side is pointing radially outwardly. The sealing ring 19 is located immediately at the outflow side or the end face of the filter element 7 and extends in the radial direction outwardly, substantially beginning at the radially outwardly positioned wall surface of the outer filter bellows 10. It can be expedient that the sealing ring 19 extends also at least partially across the axial end face at the outflow side and thus has at the inner side a smaller diameter than the diameter of the filter bellows 10 at the radially outwardly positioned wall surface.

In the mounted position the sealing ring 19 is axially loaded. It can also be expedient to additionally load the sealing ring 19 in the radial direction.

Figure 4:
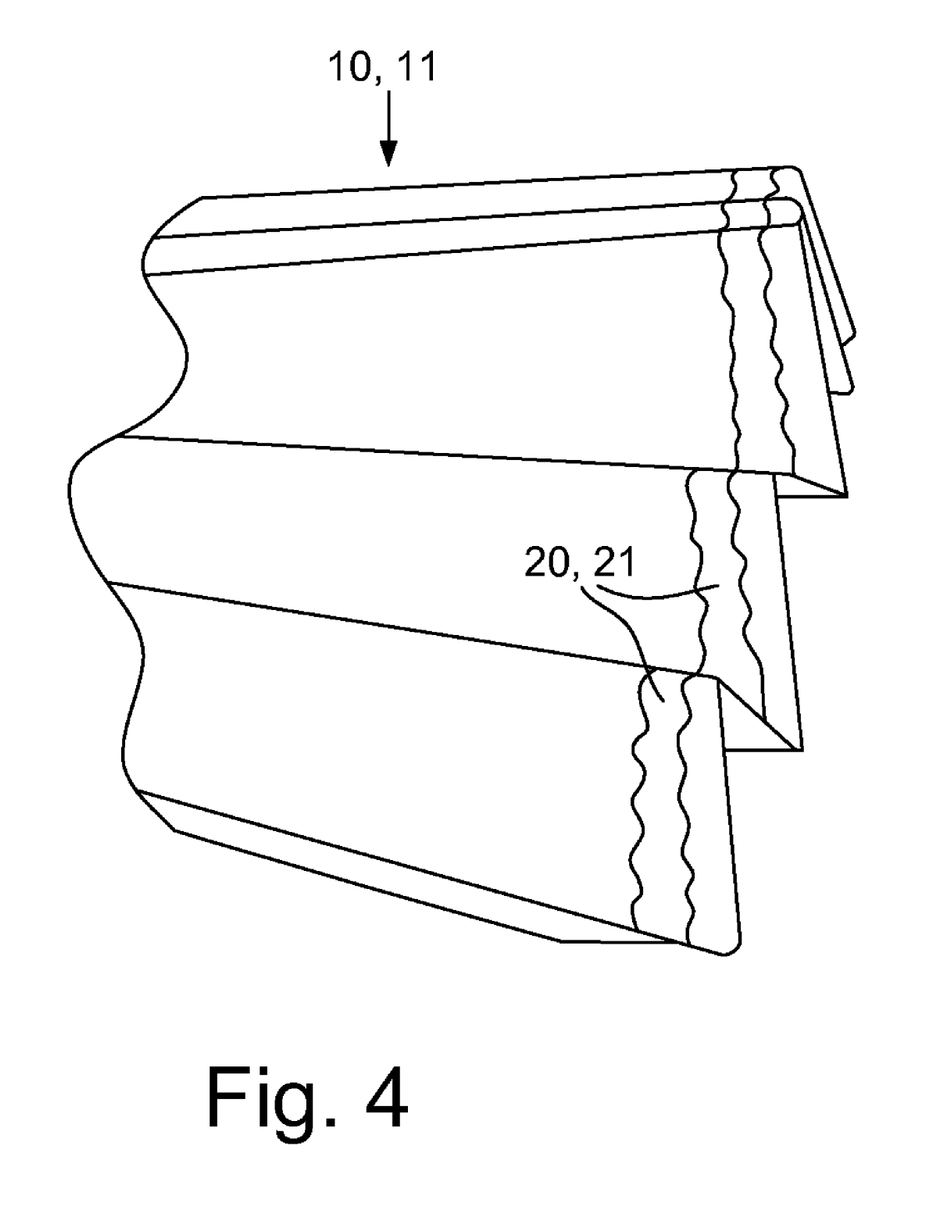
FIG. 4 a perspective view of the star-shaped filter folds of a main filter element.

As is shown in FIG. 4, the two filter bellows 10 and 11 each are configured as a star-shaped folded filter whose folds are adhesively connected in the area of one end face. For this purpose, adhesive layers 20 and 21 are applied in the area of the end faces onto the individual folds of each filter bellows in order to adhesively connect two folds to one another that are immediately contacting one another. The radially outwardly positioned filter bellows 10 has such an adhesive layer 20 at the intake side; the radially inwardly positioned filter bellows 11 has a corresponding adhesive layer 21 in the area of the outflow side. The adhesive connection has the result that two immediately neighboring folds each are glued together and between two pairs of glued-together folds in the axial direction of the longitudinal axis 5 a flow passage is formed that extends across the axial length of each filter bellows. This has the effect that, as illustrated in FIG. 3, the supplied fluid flows axially across the glued-together front edges of the radially outwardly positioned filter bellows 10 along the axial flow passages while in the radially inwardly positioned filter bellows 11 an axial outflow is possible through the front edge provided with the adhesive layer 21 in the outflow area In FIG. 4 a filter bellows 10 or 11 in the form of a star-shaped filter is illustrated during the manufacturing process. On only one side of the folds an adhesive bead 20 or 21 is applied so that upon adhesively connecting immediately neighboring folds two layers are positioned on top one another and are glued together by means of the adhesive beads. On the side of the folds opposite the adhesive beads 20, 21 a corresponding adhesive layer is not used so that at this side axial flow passages are formed.

Figures 5, 6:
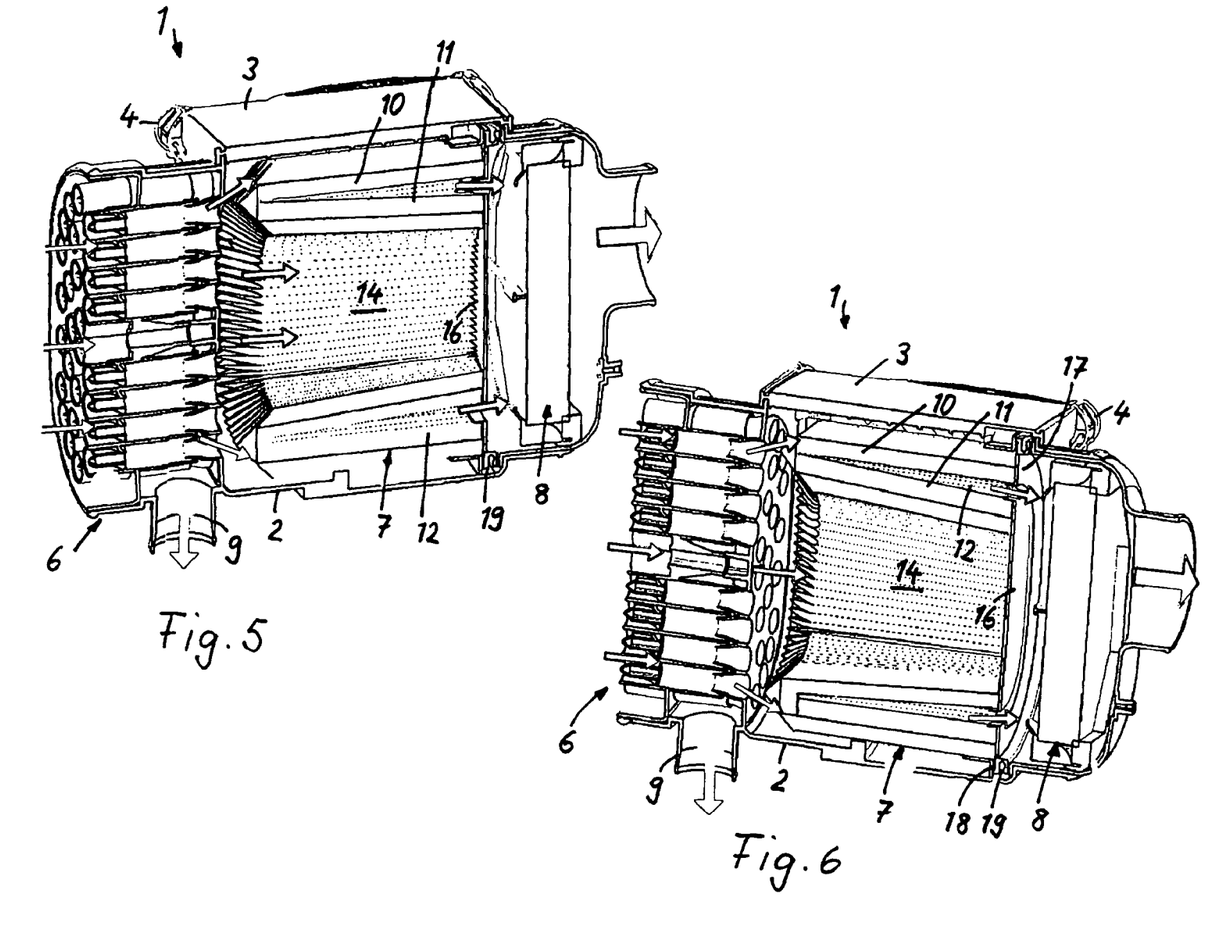
FIGS. 5 and 6 a filter device analog to FIG. 1 or 2 but with an alternative embodiment of the main filter element that is comprised of two radially nested filter bellows that are joined in the area of the axial intake side.
Figure 7:
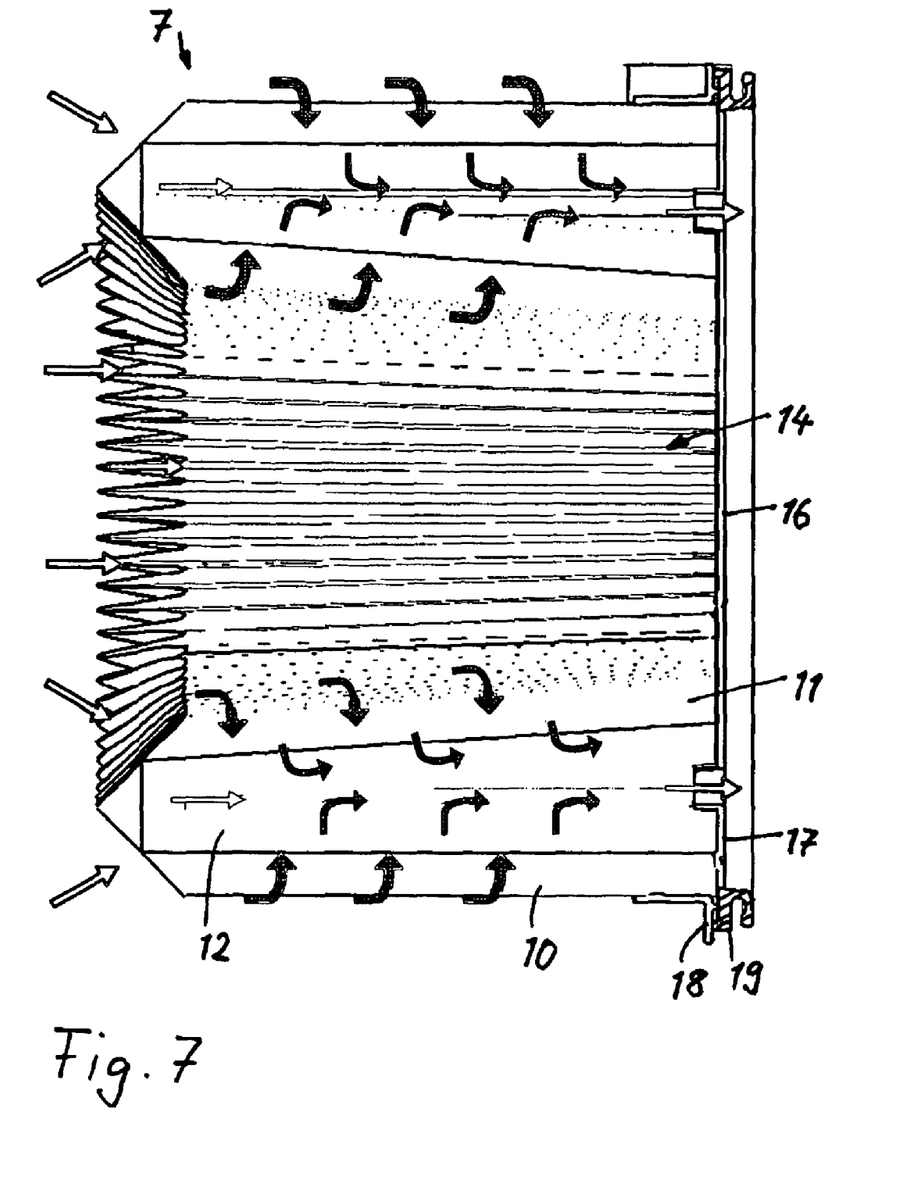
FIG. 7 the filter element of FIG. 5 or 6 in section.

The embodiments according to FIGS. 5 to 7 correspond substantially to the first embodiment illustrated in FIGS. 1 through 4 so that with respect to matching features reference is had to that description. The main filter element 7 also comprises two filter bellows with a radially outwardly positioned filter bellows 10 and a radially inwardly positioned filter bellows 11 which however in contrast to the first embodiment are not two separate components but are a common component joined at the end face. The outer filter bellows 10 has a cylindrical basic shape, the inner filter bellows 11a conical shape so that the intermediately positioned flow space 12 widens in the axial direction toward the outflow side with regard to cross-section. At the outflow side the inner filter bellows 11 is closed off fluid-tightly by cover disk 16. The outer filter bellows 10 is also covered at the outflow side in a fluid-tight way by a cover ring 17. Between the cover disk 16 and the radially surrounding cover ring 17 there is an annular gap by means of which the flow space 12 communicates with the outflow side or the filtered side.

At the intake side the outer filter bellows 10 and the inner filter bellows 11 have a common front edge where the individual folds of each filter bellows are joined at this front edge. With regard to manufacturing technology, this can be achieved, for example, in that folds in a star shape with front edges in axial direction are embossed into a cylindrical folded filter paper and subsequently a part of the filter cylinder is turned over so that two radially nested filter bellows are formed.

Figure 8:
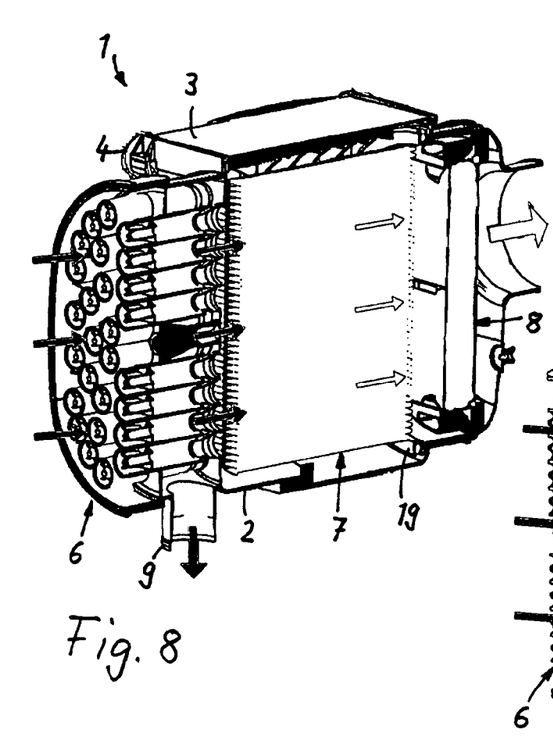
FIGS. 8 and 9 a further embodiment of a filter device with cyclone preseparator, main filter element, and downstream fine filter element, wherein the main filter element is embodied as a parallelepipedal element and is comprised of a continuous filter web with a plurality of parallel filter layers that are connected to one another by curved connecting sections.
Figure 9:
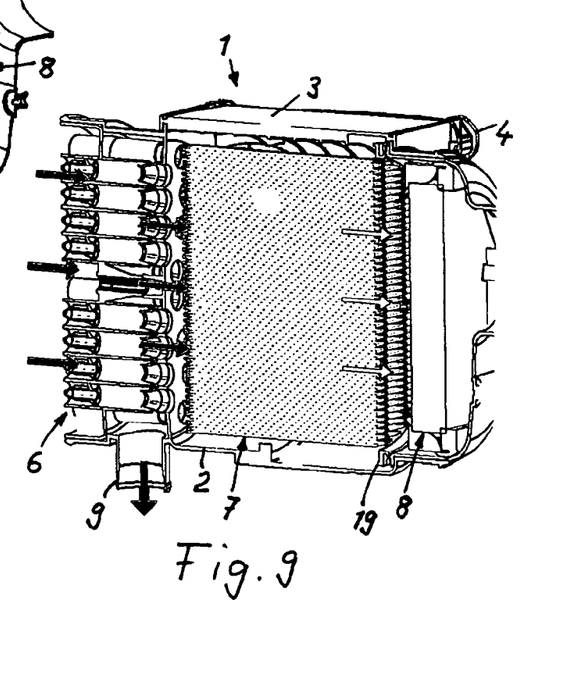

The intake is realized across the entire axial end face that is comprised of the two filter bellows 10 and 11. Outflow is realized only through the annular flow opening between the cover disk 16 and cover ring 17.

in FIGS. 8 through 12 a further embodiment of a filter device for filtration of gaseous fluids, in particular combustion air for internal combustion engines, is illustrated. As in the preceding embodiments, the filter device 1 according to FIGS. 8 and 9 is comprised of a filter housing 2 with a laterally inserted main filter element 7 that has upstream thereof in axial flow direction a prefilter 6 that is embodied as a cyclone preseparator and which has arranged downstream in the axial direction a fine filter element 8. The flow direction of air filter units is axial without reversal or deflection of the flow direction.

Figures 10, 11, 12:
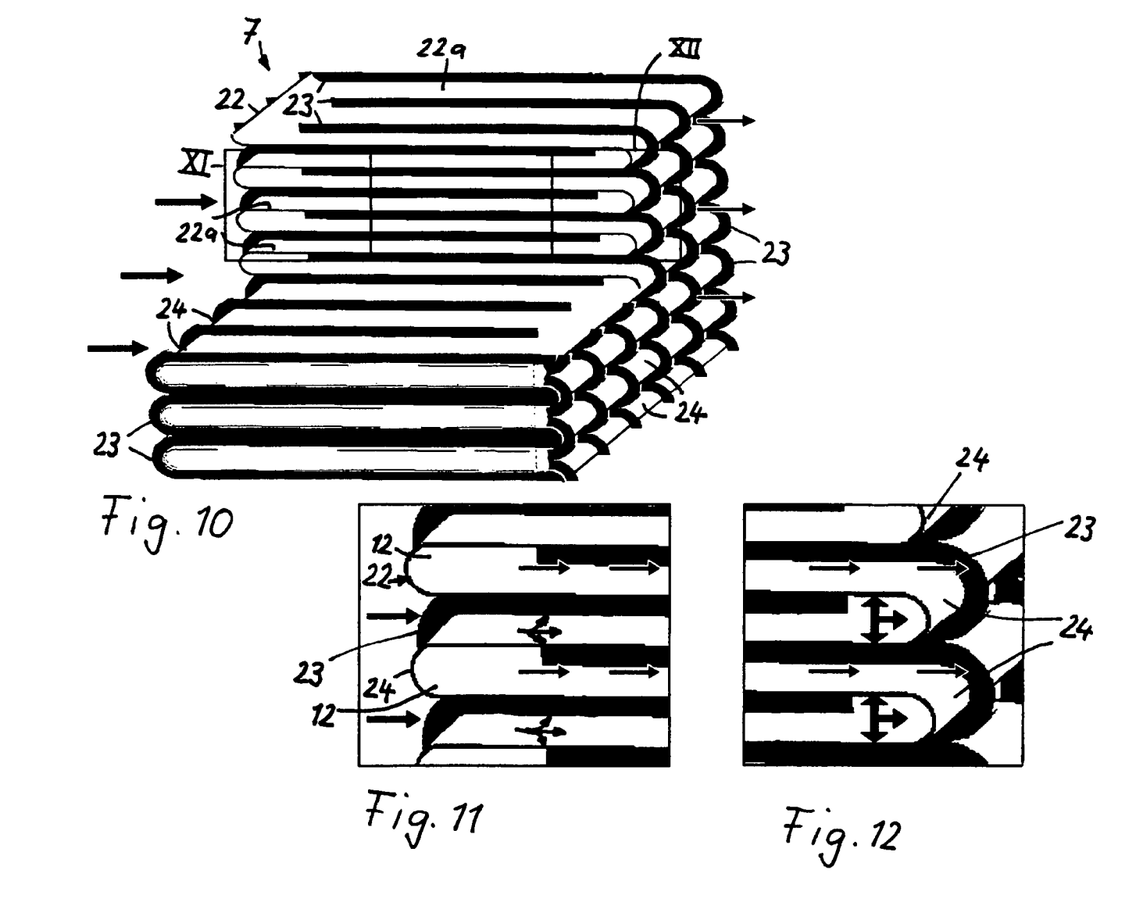
FIG. 10 the main filter element of FIGS. 8 and 9 in a perspective individual illustration.
FIG. 11 an enlarged illustration of the detail XI of FIG. 10.
FIG. 12 an enlarged illustration of the detail XII of FIG. 10.
Figures 13, 14:
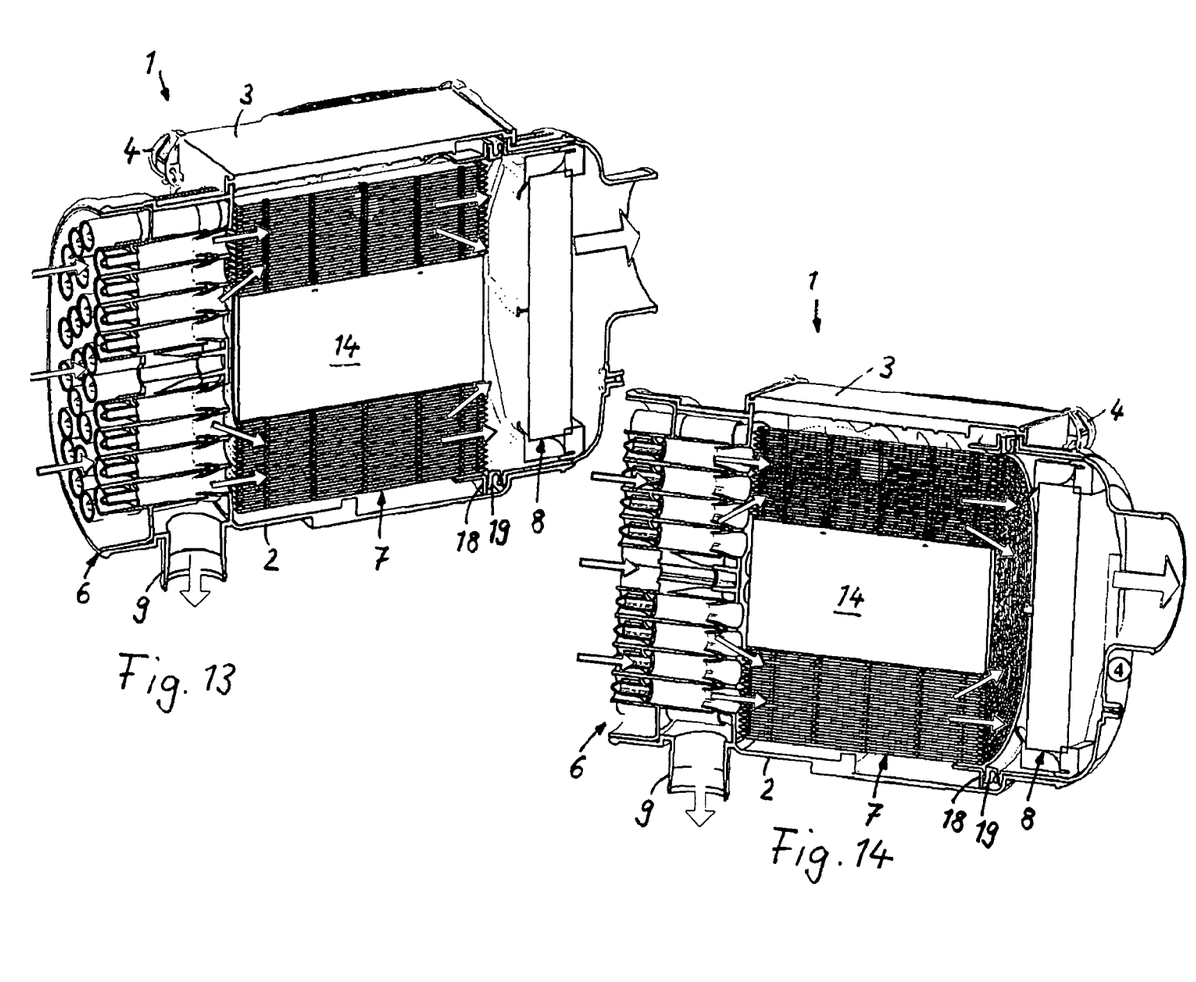
FIGS. 13 and 14 yet another embodiment of the filter device with cyclone preseparator, main filter element, and downstream fine filter element, wherein the main filter element comprises a plurality of concentrically arranged filter cylinders of filter material between which spacers are provided wherein the intermediate spaces between the filter cylinders provides flow spaces for the fluid.

In FIG. 10 through 12 the main filter element 7 is shown in detail. The filter element 7 is comprised of a continuous filter web 22 that is laid or folded to a plurality of filter layers 22a that extend parallel to one another and are spaced relative to one another. As a whole, the filter element 7 has a parallelepipedal shape. Between two neighboring filter layers 22a there are flow spaces or passages in which the fluid can flow axially. As a result of the unitary configuration with expediently only a single filter web 22, the individual filter layers 22a are connected to one another by curved connecting sections 24 which are also a unitary component of the filter web 22. In this way, at the intake side of the filter element 7 intake openings to the flow passages between parallel filter layers 22a result which, however, at the outflow side are closed by a connecting sections 24a of the filter web so that the incoming unfiltered fluid cannot axially escape but must flow radially through the neighboring filter layers. Subsequently, the fluid passes into neighboring flow spaces 12 that represent clean chambers and are closed by curved connecting section 24 in the area of the axial intake side, but at the axial outflow side are open so that the filtered fluid can flow out axially at this side out of the filter element 7.

The filter layers 22a are spaced apart by means of adhesive strips 23 that have the function of spacers and also glue together neighboring filter layers. Advantageously, across the width of the filter element a plurality of parallel extending adhesive strips 23 are arranged between two neighboring filter layers 22a. Between two parallel adhesive strips 23 there is a passage-shaped flow space. Across the entire width of the filter element in this way several parallel extending flow passages or spaces are formed between two filter layers 22a.

For producing the filter element 7, at least two parallel extending adhesive strips or beads are applied on a flexible continuous filter web, in particular expediently onto both sides of the filter web. Subsequently, the filter web is folded to form several filter layers wherein the adhesive strips connect the parallel extending filter layers and at the same time support them.

It can be expedient to provide additional spaces that optionally are non-adhesive.

A further embodiment of a filter device 1 for filtration of gaseous axial fluids is illustrated in FIGS. 13 to 17. In this embodiment the filter device 1 is also of a three-part configuration and comprises a prefilter 6, a main filter 7, and a fine filter element 8 wherein all filter units are flown through in the axial direction in the same direction and the main filter element 7 as well as the fine filter element 8 are to be inserted radially into the filter housing 2 when the housing lid 3 is open.

Figure 15:
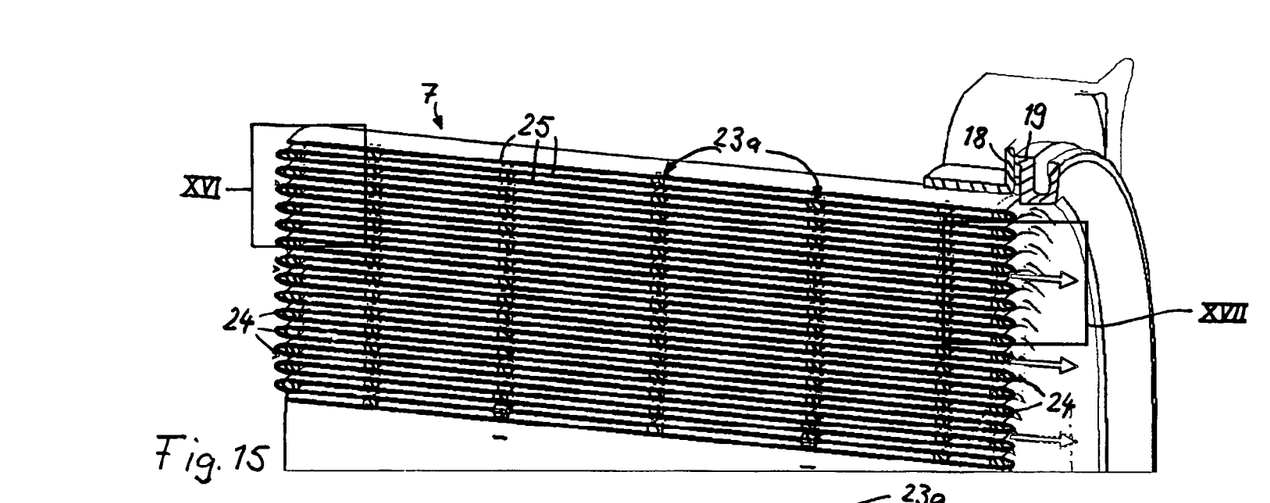
FIG. 15 the main filter element of FIG. 13 or 14 in a perspective section illustration.
Figure 16:
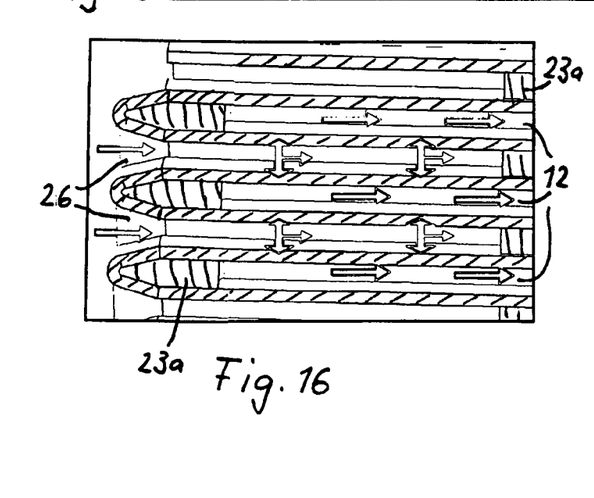
FIG. 16 an enlarged detail view of the detail XVI of FIG. 15.
Figure 17:
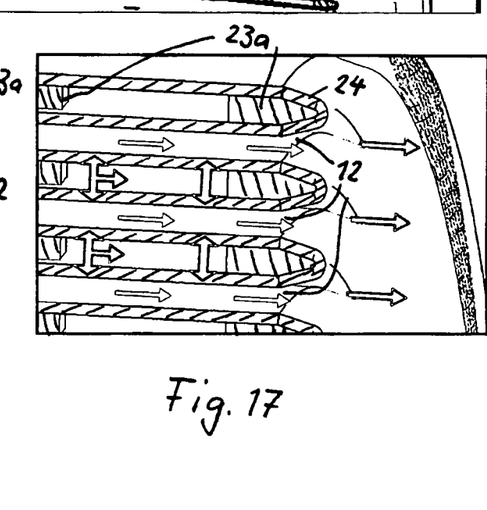
FIG. 17 an enlarged detail view of the detail XVII of FIG. 15.

As can be seen in the individual illustration of the filter element 7 according to FIGS. 15 to 17, the filter element is cylindrical and comprises a plurality of concentrically arranged individual filter cylinders 25 wherein two immediately neighboring filter cylinders 25 are positioned at a spacing to one another so that between the filter cylinders 25 a flow space is provided, respectively. As can be seen in the enlarged illustration according to FIGS. 16 and 17, these flow spaces that extend in the axial direction are closed off at the axial end face of the filter element and are open at the opposite end face of the filter element. Two flow spaces each that are positioned in the radial direction immediately adjacent to one another are closed or open at different axial end faces. In this way, flow spaces or passages are formed, on the one hand, that are closed at the intake side and open at the outflow side and through which the filtered fluid can flow out. On the other hand, intake passages 26 are formed that are open at the intake side and are closed at the outflow side. The incoming unfiltered fluid at this side cannot flow out axially through the intake passages 26 but the unfiltered fluid must radially pass through the walls of the filter material of neighboring filter cylinders and then flow axially out through the flow spaces 12 that represent the clean chambers.

Two immediately neighboring filter cylinders 25 are connected at the end face by connecting sections 24 with one another, respectively, which sections are however expediently embodied as a component separate from the filter cylinders 25 and are connected to the end faces of two radially neighboring filter cylinders. The connecting sections 24 thus have an annular shape. The connecting sections 24 connect, for example, at the intake side, two radially immediately neighboring filter cylinders 25 with one another wherein radially inwardly and radially outwardly a gap adjoins, respectively, in order to form an intake passage for the unfiltered fluid. At the outflow side the connecting sections 24 are displaced relative to the connecting sections at the intake side radially by one filter cylinder, respectively, so that the intake passages at the outflow side are closed and at the same time the flow passages for removing the filtered fluid are closed at the intake side and open at the outflow side.

In addition, spacers 23a are provided by means of which the individual filter cylinders 25 are spaced apart from one another and fixed. As shown in FIG. 15, across the axial length of the filter element 7 a plurality of individual preferably annularly designed spacers 23a are arranged wherein expediently at one axial position several spacers 23a are positioned between two filter cylinders 25, respectively. At different axial locations the spacers 23a, in accordance with the connecting sections 24 at the end faces, can be arranged between two filter cylinders, respectively, wherein expediently a spacer 23a is inserted only into every other intermediate space, viewed in radial direction, between neighboring filter cylinders, respectively. At axially different locations spacers 23a are inserted into every other gap between the filter cylinders such that, as a whole, i.e., across the entire axial length of the filter element, each intermediate space between neighboring filter cylinders is provided with spacers at least atone axial position.

The spacers 23a can be embodied as adhesive strip sections and additionally to their supporting function can also take on an adhesive function. At the same time, it is also possible to employ non-adhesive spacers.

According to a modified embodiment the filter element 7 illustrated in FIGS. 13 to 17 is comprised of a spirally wound filter web that is either provided with flat walls or has folds. By means of spacers and/or closure or cover elements the axial flow passages in the filter element are closed partially at the outflow side and partially at the intake side wherein the opposite end face of a flow passage, respectively, remains open so that the filter material of the filter element and can be radially flown through by the introduced fluid.

The invention claimed is:

1. An air filter device for an internal combustion engine, comprising
   a filter element (7) arranged in a filter housing (2) which filter element is to be flown through by a fluid to be filtered,
   wherein the filter element has a fluid flow intake side and a flow outflow side, said outflow side space apart axially from said inflow side,
   wherein the filter element (7) is embodied as a multi-bellows filter with at least two radially nested filter bellows (10, 11), at least one filter bellows (10, 11) is to be flown through in radial direction, and
   between the filter bellows (10, 11) an annular flow space (12) for the fluid is formed that is in flow communication with an end face of the filter element (7),
   wherein each filter bellows (10, 11) is embodied as a star-shaped filter with filter folds arranged in a star shape,
   wherein on at least one end face of the filter element (7) a sealing ring (19) is arranged between the filter bellows (11) and the filter housing (2),
   wherein a portion of the filter folds of one of said at least two filter bellows is immediately contacting against and adhesively connected and tacked to immediately neighboring filter folds of a different one of said at least two filter bellows at an axial end face of said filter bellows,
   wherein a cover disk (16) closes over an interior (14) of a radially inwardly one of said nested filter bellows, said cover disk (16) extending radially across said interior (14) preventing fluid in the interior (14) from flowing axially by the cover disk (16),
   wherein at least at one end face of at least one filter bellows (10, 11) a cover element (15, 16, 17) is arranged, the cover element embodied as a cover ring (15, 17),
   wherein filter media folds of a first filter bellows (10) at one end face are completely covered by a cover ring (17), and filter media folds of a second filter bellows (11) are completely covered at the opposite end face with a cover ring (15).

2. Filter device according to claim 1, wherein the front edges of the filter folds are tacked at at least one of the intake side or the outflow side.

3. Filter device according to claim 2, wherein a free flow passage is formed between two tacked filter folds each at the end face of a filter bellows (10, 11).

4. Filter device according to claim 2, wherein the tacked filter folds are glued together.

5. Filter device according to claim 1, wherein the filter bellows are embodied as individual bellows (10, 11).

6. Filter device according to claim 1, wherein
   a radially inwardly positioned one of said at least two filter bellows is conically embodied,
   wherein a radially outwardly positioned one of said at least two filter bellows is cylindrically embodied,
   wherein the flow space (12) between the nested filter bellows (10, 11) has a cross-section that increases towards the outflow side of the filter element,
   wherein the flow space (12) between the filter bellows (10, 11) is framed by a support frame (13), the support frame (13) cross-section increasing towards the outflow side of flow space (12) between the nested filter bellows (10,11) such that the support frame (13) on opposing sides supports respective ones of the radially nested filter bellows in position relative to one another and frames the flow space (12).

7. Filter device according to claim 1, wherein the flow space (12) between the nested filter bellows (10, 11) has a cross-section that increases towards the outflow side of the filter element.

8. Filter device according to claim 1, wherein the flow space (12) between the filter bellows (10, 11) is framed by a support frame (13) such that the support frame (13) on opposing sides supports respective ones of the radially nested filter bellows in position relative to one another and frames the flow space (12).

9. Filter device according to one of the claims 1,3,4,5,6,7, and 8, wherein the flow space (12) forms a clean chamber and is closed off axially relative to the intake side wherein the filter bellows (10, 11) that radially delimit the flow space (12) are each are flown through radially in the direction of the flow space (12).

10. Filter device according to claim 9, wherein a filter bellows (10) has axial intake.

11. Filter device according to one of the claims 1,3,4,5,6,7, and 8, wherein the filter element (7) is to be inserted into the filter housing (2) or is to be removed from the filter housing (2) in a direction transverse to the flow direction.

12. Filter device according to one of the claims 1,3,4,5,6,7, and 8, wherein at least one further filter unit (6, 8) is provided in the filter housing (2), wherein the filter element (7) and the further filter unit (6, 8) are positioned sequentially behind another and have a common flow direction for the fluid to be filtered, wherein the further filter unit is embodied as either a cyclone preseparator or arranged upstream of the filter element (7) or as a fine filter (8) that is arranged downstream of the filter element (7).

13. Filter device according to claim 12, wherein the fine filter (8) is to be inserted into the filter housing (2) or to be removed from the filter housing (2) in a direction transverse to the flow direction.

14. Filter device according to claim 1, wherein the annular flow space (12) formed between the nested filter bellows (10,11) is open for flow at either the intake side or the outflow side of the filter element (7) and is closed off to flow at the opposing flow side of the filter element (7),
   wherein the annular flow space (12) is open only to one of the flow sides of the filter element (7).

15. Filter device according to claim 14, wherein the filter element includes an annular cover ring (15) arranged at the closed off flow side connecting adjacent axial end faces of the nested filter bellows (10,11).

* * * * *